(12) United States Patent
Magne

(10) Patent No.: US 9,392,604 B2
(45) Date of Patent: Jul. 12, 2016

(54) SYSTEM FOR PRODUCING SIMULTANEOUS MULTILINK DIRECTIONAL BEAMS

(71) Applicant: BLUWAN, Le Pecq (FR)

(72) Inventor: Francois Magne, Le Pecq (FR)

(73) Assignee: Bluwan, Le Pecq (FR)

( * ) Notice: Subject to any disclaimer, the term of this patent is extended or adjusted under 35 U.S.C. 154(b) by 27 days.

(21) Appl. No.: 14/322,289

(22) Filed: Jul. 2, 2014

(65) Prior Publication Data

US 2015/0009912 A1 Jan. 8, 2015

(30) Foreign Application Priority Data

Jul. 2, 2013 (FR) ...................................... 13 56443

(51) Int. Cl.
*H04W 72/04* (2009.01)
*H04B 7/06* (2006.01)

(52) U.S. Cl.
CPC ........... *H04W 72/046* (2013.01); *H04B 7/0617* (2013.01)

(58) Field of Classification Search
CPC . H04B 7/0615; H04B 7/0617; H04W 72/044; H04W 72/046
See application file for complete search history.

(56) References Cited

U.S. PATENT DOCUMENTS

| 4,675,863 A * | 6/1987 | Paneth | H04W 52/20 370/334 |
| 6,281,853 B1 * | 8/2001 | Caille | H01Q 3/02 343/753 |
| 8,457,026 B1 | 6/2013 | Ho et al. | |
| 2002/0154687 A1 * | 10/2002 | Bierly | H01Q 3/26 375/222 |
| 2003/0002458 A1 * | 1/2003 | Bernheim | H04Q 1/10 370/330 |
| 2005/0124307 A1 * | 6/2005 | Ammar | H04B 1/38 455/183.2 |
| 2008/0102760 A1 * | 5/2008 | McConnell | H04B 7/0617 455/73 |
| 2013/0121342 A1 * | 5/2013 | Kim | H04B 7/0408 370/436 |
| 2014/0044044 A1 * | 2/2014 | Josiam | H04W 24/10 370/328 |
| 2014/0233436 A1 * | 8/2014 | Long | H04B 7/0617 370/278 |

FOREIGN PATENT DOCUMENTS

WO 02069443 A1 9/2002
WO 2008049191 A1 5/2008

* cited by examiner

*Primary Examiner* — Xavier Szewai Wong
(74) *Attorney, Agent, or Firm* — Baker & Hostetler LLP

(57) ABSTRACT

A system for forming beams that are suited to a given coverage, has at least the following elements: a configuration manager, a set of modems in contact with switches, multiplexers for multiplexing the modems by group onto as many intermediate ports each corresponding to a beam, a module for forming pathways generating a number of pathways distributed about the axis of the antenna, a phase-shift module for the beams of each of the pathways, a power transposition-amplification module and at least two antennas connected to said transposition-amplification module. For the reception part, the system comprises a set of modules that are identical with the exception of the transposition-amplification module, which carries out the low-noise reception and the transposition.

9 Claims, 9 Drawing Sheets

SYSTEM FOR PRODUCING SIMULTANEOUS MULTILINK DIRECTIONAL BEAMS

CROSS-REFERENCE TO RELATED APPLICATION

This application claims priority to foreign French patent application No. FR 1356443, filed on Jul. 2, 2013, the disclosure of which is incorporated by reference in its entirety.

FIELD OF THE INVENTION

The subject matter of the invention relates to a system allowing the generation of a set of simultaneous multilink directional beams, the arrangement of which is optimized in terms of link status for the coverage of terminals that are located in a given sector.

The invention is notably intended for systems that are made up of a set of connections allowing points of presence to be provisioned and grouped together from and to the infrastructure network, better known by the term "backhaul".

BACKGROUND

The very high speed (THD) connection or "backhaul" of the fourth generation of mobile radio (LTE), of Wifi terminals or Wifi points better known by the name "hot spots", or else enterprises, consists in having a point-to-multipoint wireless network from a central station to terminals by setting up simultaneous links of very high speed, around 100 Mbps, from this central station or transmission hub to each terminal.

The coverage is often provided by sectors, typically of 90°. The capacity needs for the backhaul of the fourth generation of mobile radio are several gigabits per sector and more precisely a few Gigabits per $km^2$. In order to attain such capacities, it is necessary to have very wide radio bands such as those available in digital wavelength microwave frequencies, or EHF for "Extremely High Frequency", the only ones to have very wide bands greater than one GHZ (bands Q, W, E or D), or at centimeter wavelength microwave frequencies, or SHF for specially high frequency (bands Ku and Ka). For the case of SHF, the congested spectrum does not allow the required band to be obtained in the ether; on the other hand, at intermediate frequency (latent), the cost effectiveness of processing in this frequency range is at an optimum. There is little point/multipoint system of high capacity at present, and the local multipoint distribution service or LMDS from the Cambridge Telecom company and the FTTA system from the applicant, which is capable of multiplexing twenty or so modulators/demodulators or modems at 100 Mbps on a sector, may be cited.

Although the various systems operate correctly, it is necessary to increase the performance thereof, to optimize the spectral resources, the reuse of frequencies, for example, and to process capacity management ("load balancing") or resilience problems.

The following definitions will be used in the description of the invention that follows.

The very high speed or THD relates to transmission speeds on each link of at least 20 Mbps, the high speed relating to speeds of 2 Mbps and above. The capacity is the total of the speeds on each link.

"Point-to-multipoint" systems use sector antennas at their central station, which set up the connections to the terminals situated under the coverage of the sector antenna. The transformation of a sector beam into a group of more directional beams with higher gains within this sector beam is denoted by the term "multibeam". This is radiation from the central station to a sector that has a plurality of communication beams with a high gain greater than that of a sector antenna. The device for forming pathways associated with these beams is called an MBF for "multibeam former". These pathways convey the multiplexes in the subsectors (beams) suited to the distribution of the terminals and to the speed requirements thereof. Each of the input ports of the MBF is provisioned by a multiplex from a plurality of modems, and there are as many multiplexers as subsectors or beams. The output ports of the MBF are each connected to an elementary antenna, directly if the pathways are formed at radiofrequency RF, or indirectly if the pathways are formed at intermediate frequency FI. The document WO 2008/049191 poses and solves the problem of minimization of the possible interference generated by electronic components.

The multiplex is the association of a plurality of waveforms sent on each of the beams, each waveform being transmitted on a channel that corresponds to a modem. Each of the beams can convey one or more bidirectional channels. A multiplex contains a plurality of channels, one channel is associated with a modem, and each of the channels has a different frequency and may have a different band and also a different modulation order. The multiplexes may be different from one another. There is thus a diversified capacity in a beam, said capacity being composed of diversified speeds.

The term "beam" denotes the radio lobes propagated in the ether. "Pathways" denote the paths followed in the circuits which, by microwave combination in the antenna system, will create the beams.

One of the aims of the present invention is to propose a system of very high capacity that is capable of delivering capacities of n*100 Mbps, where n is adjustable from the request, in a plurality of simultaneous directions in order to provide notably the following functions: a notable increase in the status of the links, optimization of the link statuses according to the distance at which a terminal is situated, better known by the expression "near-far", a function of balancing of the streams known by the term "load balancing", a resilience function, entry management for new terminals, and finally the rejection of interference from a sector with the neighbouring sector.

SUMMARY OF THE INVENTION

The subject matter of the invention relates to a system carrying out the formation of simultaneous multilink directional beams suited to a given coverage, using one or more multibeam antennas, characterized in that it has at least the following elements:

a configuration manager suited to managing switching and phase-shift commands configuring the beams, a set of modems that is suited to operating at an intermediate frequency configured by the manager, for the transmission part, each output of a modem being in contact with a set of switches assigning the modems to a plurality of pathways Vj, a set of multiplexers receiving the signals from the set of modems, said set being suited to multiplexing the modems by group onto as many intermediate ports each corresponding to a beam, a module for forming pathways Vj receiving each output of the multiplexers so as to create a number of pathways Vj distributed about the axis of the antenna, a phase-shift module suited to applying a phase shift to each of the pathways Vj, a power transposition-amplification module controlled by a control module, at least two elementary antennas connected to said transposition-amplification module.

The system may have, on the reception part:

a set of antennas connected to a transposition-amplification module, a phase-shift module, a module for forming pathways, a demultiplexer connected to a set of switches, said set of switches being connected to the modems.

According to an embodiment, the system is adapted to operating at SHF/EHF microwave frequency, the set of switches, the multiplexing module, the module for forming pathways and the phase-shift module being adapted to working at SHF and the transposition module and the elementary antennas being suited to working at EHF.

By way of example, the modules working at SHF are passive circuits and the transposition-amplification modules are GaAs monolithic microwave integrated circuits MMIC.

By way of example, the control module is a very stable local oscillator with low phase noise, distributed to the transposition-amplification module.

By way of example, the control module is a synthesizer.

By way of example, the antennas used in the system are patch column or slot antennas.

According to another embodiment, the antennas are source antennas in the focal plane of a lens.

The invention notably relates to a microwave device in a very high capacity wireless Ethernet system or network.

BRIEF DESCRIPTION OF THE DRAWINGS

Other features and advantages of the system according to the invention will become more apparent on reading the description that follows for an exemplary embodiment provided by way of illustration but implying no limitation together with the appended figures, in which.

DETAILED DESCRIPTION

The description that follows, which is provided by way of illustration and without implying any limitation, concerns a Gigabit Backhaul system of point-to-multipoint or PmP type on SHF or EHF waves connecting an access point to the infrastructure or fibre, to high-capacity terminals such as mobile radio base stations, WiMax and Wifi hot spots, buildings or enterprise groups.

The principle of the system consists notably in forming beams adapted to the coverage of the terminals with multi-beam antennas so as not to illuminate areas without terminals, or so as to barely illuminate areas in which the terminals are close to the central base and to provide gain for distant terminals. A set of simultaneous beams will be created that are oriented definitively in order to set up multiple permanent links that are fixed, optimized in terms of link status and have a variable speed as shown in FIG. 1.

Figure 1:
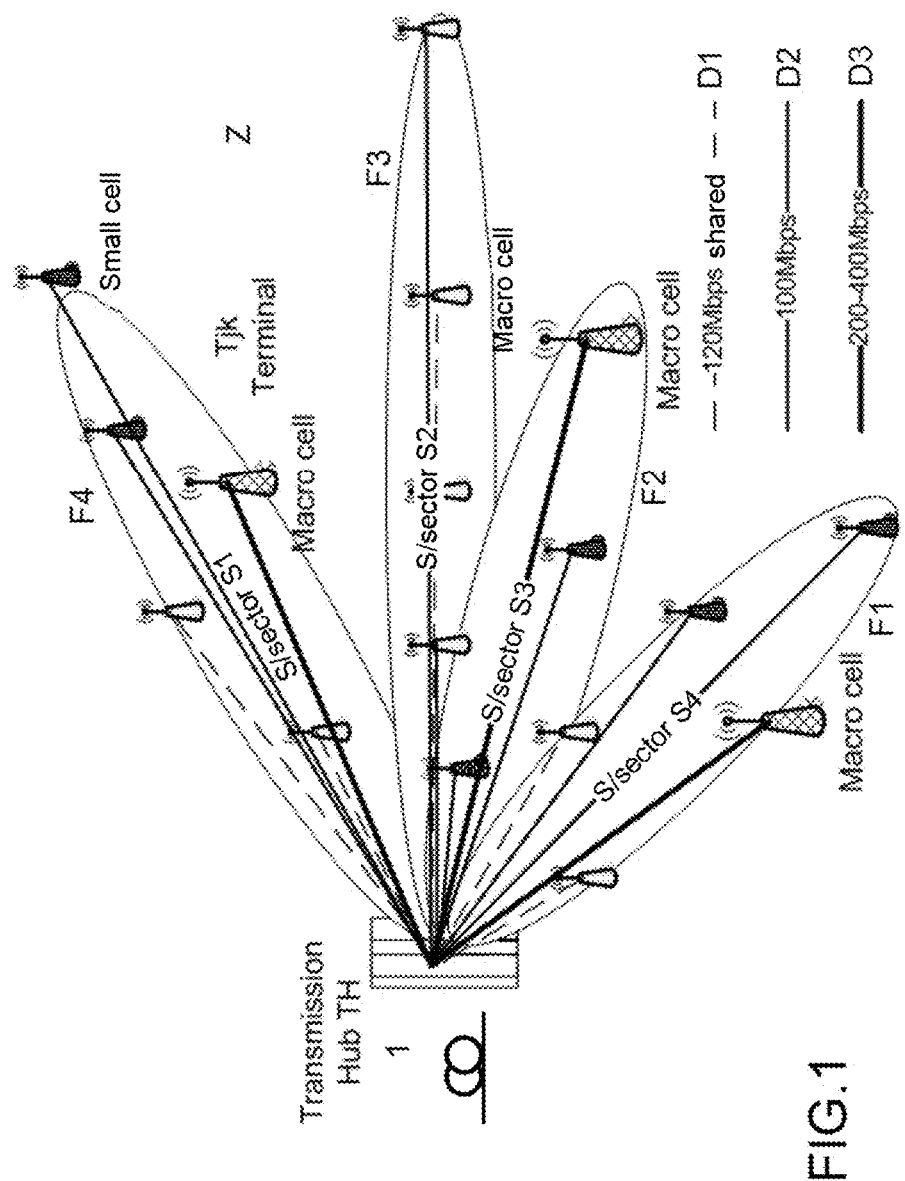
FIG. 1 shows a representation of the beams transmitted by the system and terminals assigned to these beams with links of varied capacity.

In this FIG. 1, the system, from a base 1 or transmission hub, creates a set of simultaneous multilink directional beams Fj in a given sector Z. The area or sector Z comprises a plurality of subsectors SSi and various transmission speeds, for example referenced $D_1$ for a speed of 120 Mbps, $D_2$ for 100 Mbps, $D_3$ for the interval [200 Mbps-400 Mbps], these speeds being assigned on the basis of the type of terminal, for example. The arrangement of the beams is optimized in terms of link status for the coverage of the terminals Tjk that are situated at that point, as will be described below.

The system, from the base 1, assigns to each of these beams Fj multiple links, having various capacities, to terminals Tjk, the k-th terminal in the beam Fj, said links being adaptable on the basis of the requirement of the moment. Thus, in each beam Fj, the terminals Tjk under the coverage of this beam have tiered speeds DK.

By way of example, these links are provided on layers ISO 1 and ISO 2 of the terminals by modems having a capacity of at least 20 Mbps and typically 100 Mbps, thus creating a system having a capacity greater than one Gigabit per sector and several hundreds of Megabits per beam.

Figure 2:
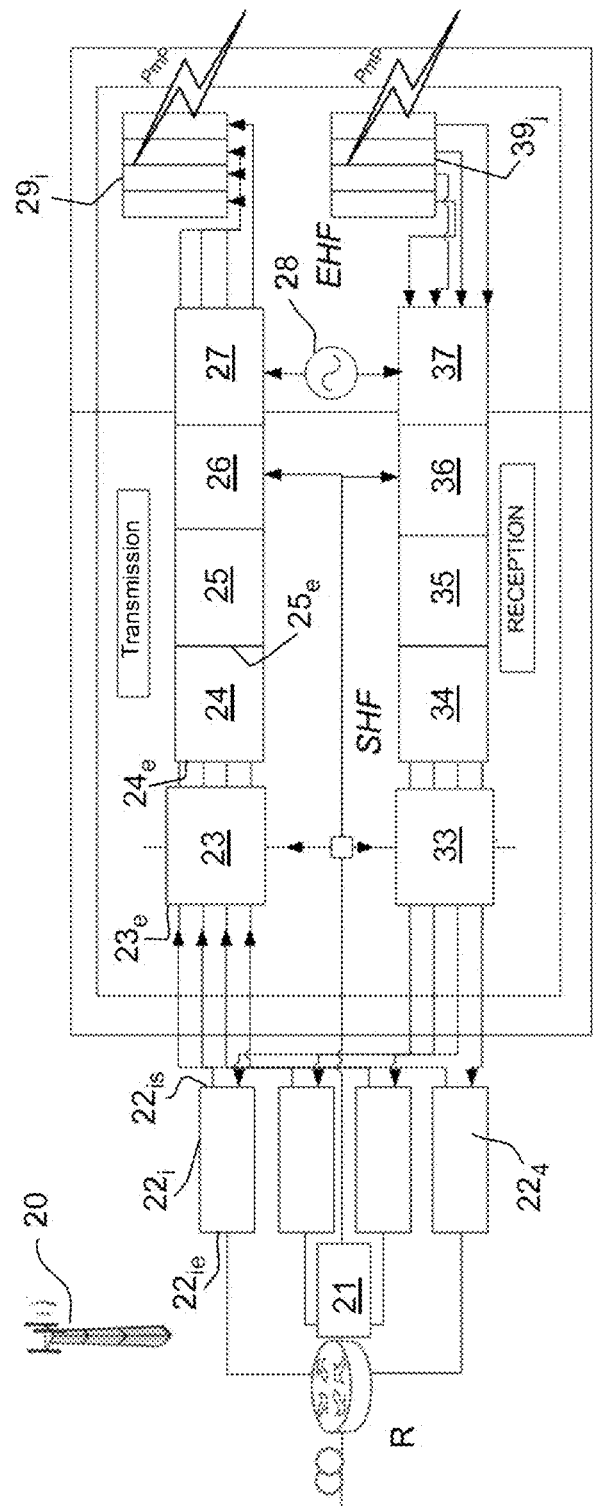
FIG. 2 shows an overall functional block diagram.

FIG. 2 shows the block diagrams for the system built on a series of very wide band microwave subassemblies. The system is installed on a pylon or mast 20 that, with the routing elements R, constitutes a transmission node or "transmission hub" that is associated with a sector Z comprising a plurality of terminals.

The transmission "hub" 1 (FIG. 1) is connected to the optical fibre and comprises a switch/router combination R and, by way of example, a manager 21 that allows configuration of the system by applying the commands from the features of the modems and the switching and phase-shifter commands outlined below. The device comprises a plurality of inputs 20e and a plurality of outputs 20s (which are not shown for reasons of simplification) between the router R and a stack of modems 22i, TDD, the abbreviation for Time Division Duplex, that each operate at an intermediate frequency FIi, i being the index of the modem. The number of modems is chosen on the basis of the number of terminals and the required capacity. The band of each modem or channel is 20, 40 or 80 MHz, for example. The total band that is necessary is in the GHz class, including the guard bands. Thus, the intermediate frequency FIi will need to be at least SHF in order to contain such a band. Typically, an effective passband of at least 250 to 500 MHz contiguous to and fro will be used.

The manager 21 notably has the function of configuring the system by transmitting to a phase-shift module, for example, a command allowing adaptation of the value of the phase Φ of each pathway of a beam, on the basis of the arrangement of various terminals that are present in a subsector or a sector. The manager 21 would also manage the transmission power of each modem 22i per beam on the basis of the position of the terminal that needs to be reached. It also manages the value of the frequency FIi of each modem, and finally manages the reception amplitudes. The operation of the manager 21 will be clarified at the end of the description.

Each modem $22i$ is on a channel Ci in this wide band FI. In each beam Fi, it is possible to connect one or more terminals for a modem.

Figure 3:
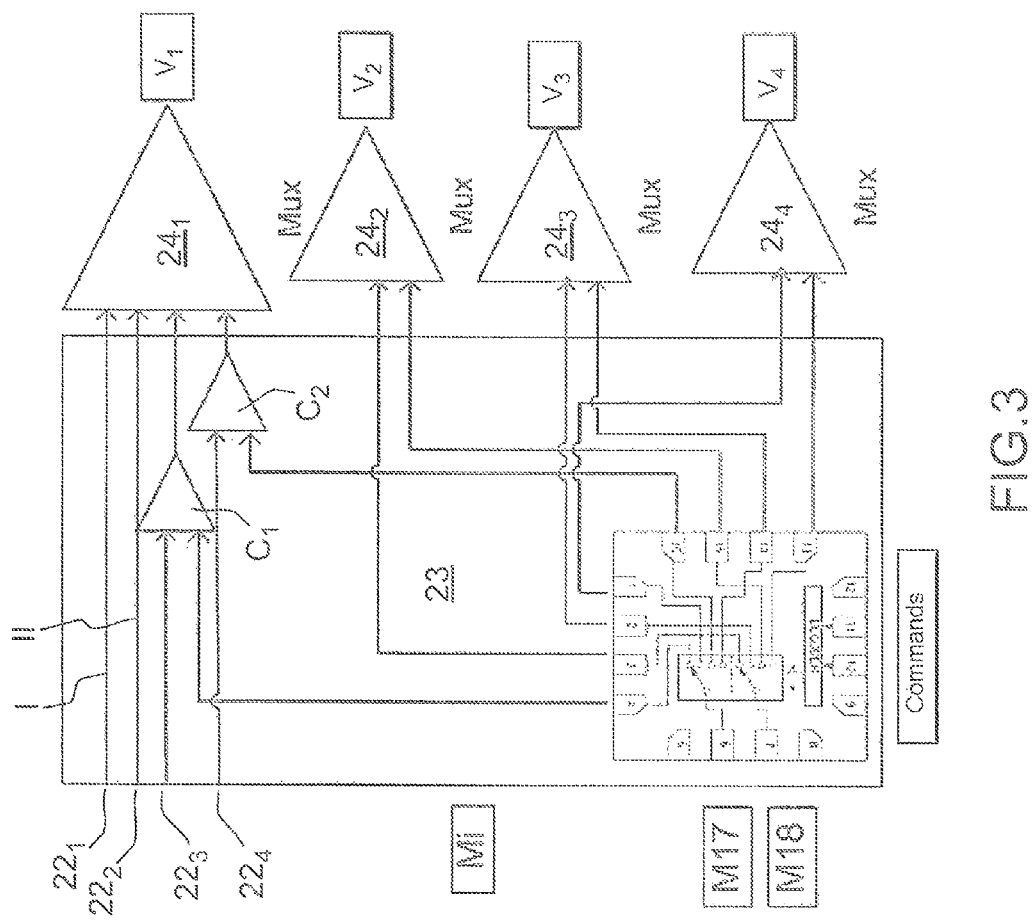
FIG. 3 shows a switching diagram towards the multiplexing.

In the transmitting part of the system, the outputs $22is$ of the modems $22i$ are connected to the inputs $23e$ of a set of switches 23 assigning the modems to the pathways Vi (FIG. 3). The set of switches 23 will switch the modems to the ports $24e$ of the multiplexing module 24, the module being composed of a plurality of multiplexers $24l$. Each multiplexer in the multiplexing module 24 will multiplex the modems $22i$ onto as many intermediate ports each corresponding to a beam, thus assigning a group of modems to a pathway Vj (FIG. 3). The results of these multiplexing operations are transmitted to a module 25 for forming pathways in order to create a network of beams distributed regularly about the axis of the antenna of the system. The formation of pathways is intended to provide the beams that will each contain a multiplex of modems that is created at 24.

Figure 4:
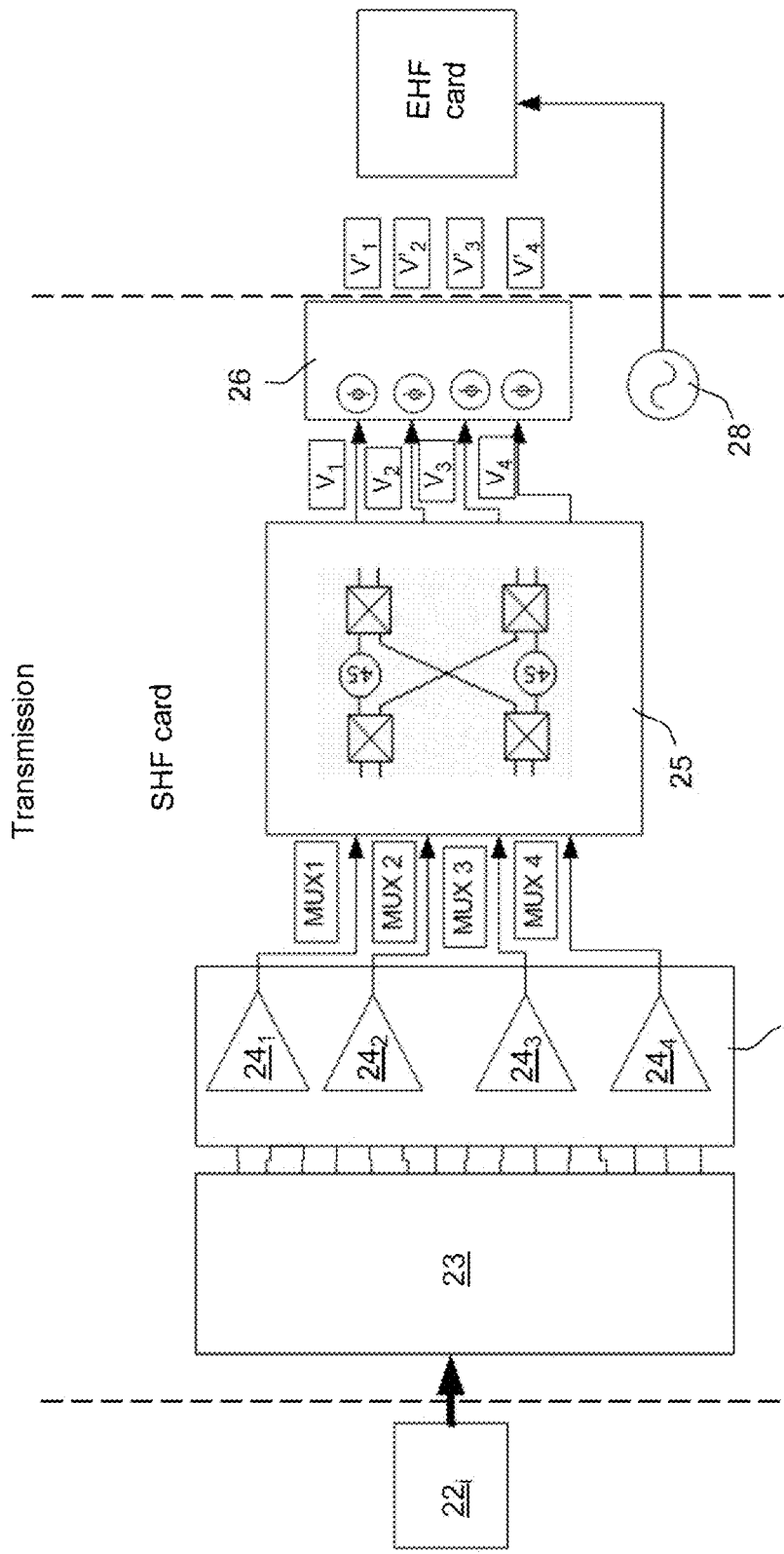
FIG. 4 shows a diagram of the SHF card and of the module for forming pathways.

In the transmission chain, for example, each output $24s$ of multiplexer $24l$ is applied to an input $25e$ of a module for forming pathways MBF 25, and said module will combine and couple these inputs in order to create pathways Vj (FIG. 4).

The formation of the pathways is carried out at two times: a first subassembly 25 provides the desired number of pathways (typically 4 or 8), which are then symmetrical and regular in relation to the radiation axis, and a second module 26 modifies the phases of the pathways with the aim of orienting the beams about their basic symmetrical position.

The network of beams that is created by the MBF module 25 is therefore transmitted to a phase-shift module 26, to which a digital word (for example 3 bits) is applied that produces the phase shift $\Delta\Phi$ (angular offset) on each of the pathways Vj so as to place the beams more precisely with respect to one another, thus clarifying the position of the beams for the best association and coverage of the terminals. Besides the function of angular adjustment of the beams, the phase-shift module 26 can compensate for the phase shifts resulting from continuous lines in the modules of the system. The output of each phase-shifted port is transmitted to a module 27 for transposition-amplification of transmission power that is controlled by a very stable local oscillator 28 with low phase noise distributed to the MMICs of the module 27, for example, and more precisely an SHF/EHF synthesizer. The synthesizer allows synchronized transposition towards the antenna ports for transmission and reception. The transposition and amplification module is produced using monolithic microwave integrated circuit, or MMIC, technology.

The transposition module 27 is connected from the ether to at least two elementary antennas $29i$ that are made up, by way of example, of patch columns or of sources in the focal plane of a lens, creating, by electromagnetic coupling, the desired beams from the pathways, and said beams radiate the capacity assigned by the multiplex of modems to the terminals under the coverage of the beam. Exemplary embodiments of antennas are provided in FIG. 9.

The transposition module 27 and the EHF antenna subassembly composing the radiation graph from the pathways formed at SHF constitute the active part of the device. The SHF part is a passive part once configured (switches and phase shifters set up).

In order to illustrate the invention, it is possible to provide the following coded example: the use of 16 modems, 32 terminals, subsectors or beams between 4 and 8.

Technologically, the system comprises a first SHF card (FIG. 4) having the lossy passive circuits, the switching module 23, the multiplexing module 24, the MBF module 25, the phase shifter 26, and an EHF card comprising the main active elements, notably the transposition-amplification module 27 and the antennas. The complete implementation is effected by adding two symmetrical subassemblies, one for transmission and the other for reception. The transmission and reception subassemblies are identical for the SHF part and differ on the EHF part.

The reception part of the system has a set of elementary antennas $39j$ receiving the signals, said antennas being made up of patch columns or of sources in the focal plane of a lens, which are identical to the antennas $29j$, for example. The outputs of the reception antennas $39j$ are connected to a transposition-amplifier module comprising low noise receivers 37, which are controlled by the aforementioned local oscillator 28. The transposed signals are transmitted to a phase-shift module 36 that applies the same phase-shift coefficients as for the transmission on each of the beams. The rephased pathways are then transmitted to an MBF module 35 that is identical to the module 25, and then to a demultiplexer 34. The output of the demultiplexer is connected to a plurality of inputs of a switch 33 that is configured in identical fashion to the switch 23. The outputs $33s$ of the switch 33 are transmitted to the various modems.

The switching, multiplexing and pathway formation functions are carried out at intermediate frequency FI, for example. The losses are thus masked by the EHF card, comprising, through symmetry with the transmission part, the low noise transposition-amplification module. Once the system is configured, this SHF part is passive and guarantees low consumption and a high level of robustness.

The modems $22i$ are switched so as to be able to provide more capacity for the beams according to needs or to provide redundancy in the event of failure of one of them. By way of example, the provision of the switches is assured by a switching matrix in GaAs monolithic microwave integrated circuit, or MMIC, technology so as to obtain a high level of isolation between the channels and to obtain integration that is necessary for the compactness of the SHF card. A plurality of elementary switches is connected in series and in parallel between the modems and the multiplexers according to the number of modems to be fitted per pathway and the desired levels of load adaptation and resilience.

FIG. 3 shows a switching example in which two additional modems are used for resilience or for increasing capacity in any subsector. To this end, a switch of SPT4 type, which is known to a person skilled in the art, uses couplers to connect to the modems that are set up at the input ports of each multiplexer. To simplify the representation, only the wiring on the first pathway has been shown, the same scheme applying to each. If more modems need to be exchanged, more switches and couplers will be used on this principle or on another. The modems $22_1$, $22_2$ are connected directly, I, II, to the multiplexer $24_1$; the modem $22_2$ is connected to a first input $C_{1e1}$ of a coupler $C_1$, and the second input $C_{1e2}$ of the coupler receives the modem signals $M_{17}$ from the switch; the modem $22_3$ is connected to a first input $C_{2e1}$ of a coupler $C_2$, and the second input $C_{2e2}$ of the coupler $C_2$ receives the modem signals $M_{18}$ from the switch, with the output $C_{1s}$ of the coupler $C_1$ and the output $C_{2s}$ of the coupler $C_2$ being connected to the multiplexer $24_1$.

The outputs $24s$ of the multiplexers are then redirected towards the module for forming pathways Vj of the module for forming pathways MBF (see FIG. 4). A similar scheme is applied for the receiving part of the system, symmetrically, at reception, and the inputs of the demultiplexers are broken out towards the ports of the modem switch.

Each beam conveys a plurality of multiplexed modems. At transmission, the outputs of the ports of the switching matrix provision the ports of the transmission multiplexers, and the return signals are respectively received on the ports of the demultiplexers in order to enter the switching matrix.

The multiplexers or the demultiplexers used in the present invention are provided by lines and cascade couplers, for example. These couplers are well known to a person skilled in the art, such as Lange couplers, Wilkinson couplers, hybrid or else annular couplers.

The formation of pathways is intended to provide the beams that will contain the multiplex of modems in each of them. In the transmission chain, for example, each multiplexer output is applied to an input of an MBF module. The latter will combine and couple these inputs in order to create pathways Vj and shift the phase of these pathways in order to provide, at the output, pathways Vj' that, by means of combinations in the final antenna, will produce the beam directions. The formation of the pathways is carried out at two times, for example: a first subassembly provides the desired number of pathways, typically 4 or 8, which are then symmetrical in relation to the radiation axis, and a second subassembly modifies the phases of the pathways in order to orient the beams about their basic symmetrical position by separating or tightening the beams in relation to the axis, as can be seen by comparing FIGS. 6 and 7.

FIG. 4 provides an example of a scheme for forming basic pathways with 4 pathways from, by way of example, a Buttler matrix in the module 25 followed by phase shifters of the module 26. Each multiplex of modems Muxi is transmitted to the module 25 for forming pathways, which generates a plurality of pathways $V_1, V_2, V_3, V_4$.

Figure 6:
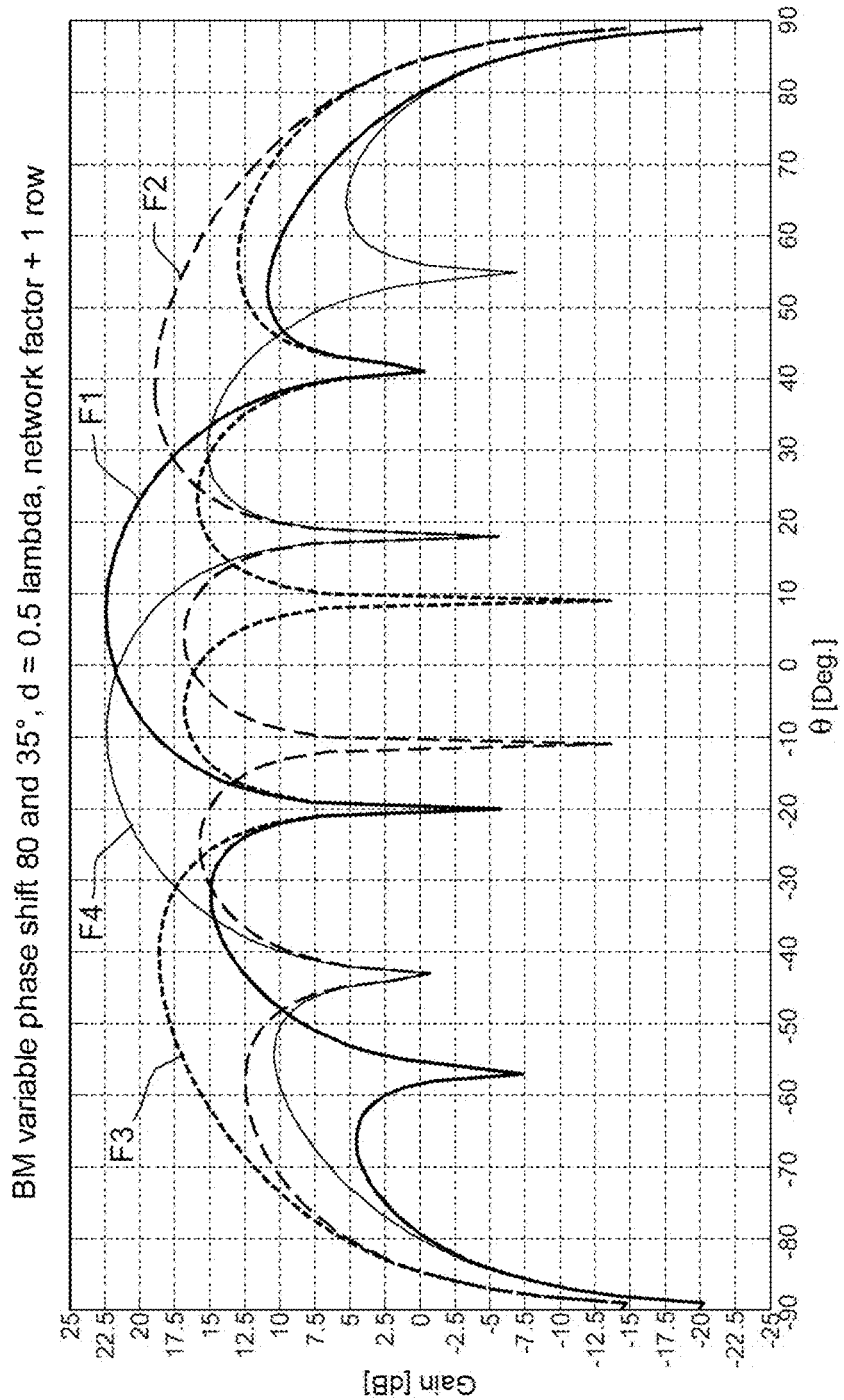
FIG. 6 shows an example of formation of beams or radiation graphs.

The production of the pathways is carried out by a device of lines and of couplers carrying out the phase combinations for each direction. To this end, it will be possible to use technologies that are known to a person skilled in the art, such as Buttler matrices (FIG. 4, module 25) or Blass matrices or else a Rothman lens. These types of circuits have been produced in microwave ranges and notably with success at SHF by several academic laboratories. FIG. 6 shows an example of the lobes and directions obtained for 4 pathways.

At the outputs of the pathway formation circuit MBF, 25, the pathways $V_1, V_2, V_3, V_4$ are then shifted in phase by an array of phase shifters 26 in order to clarify, around their basic position, the desired directions. The phase-shifted pathways are referenced $V'_1, V'_2, V'_3, V'_4$ (FIG. 4).

Figure 7:
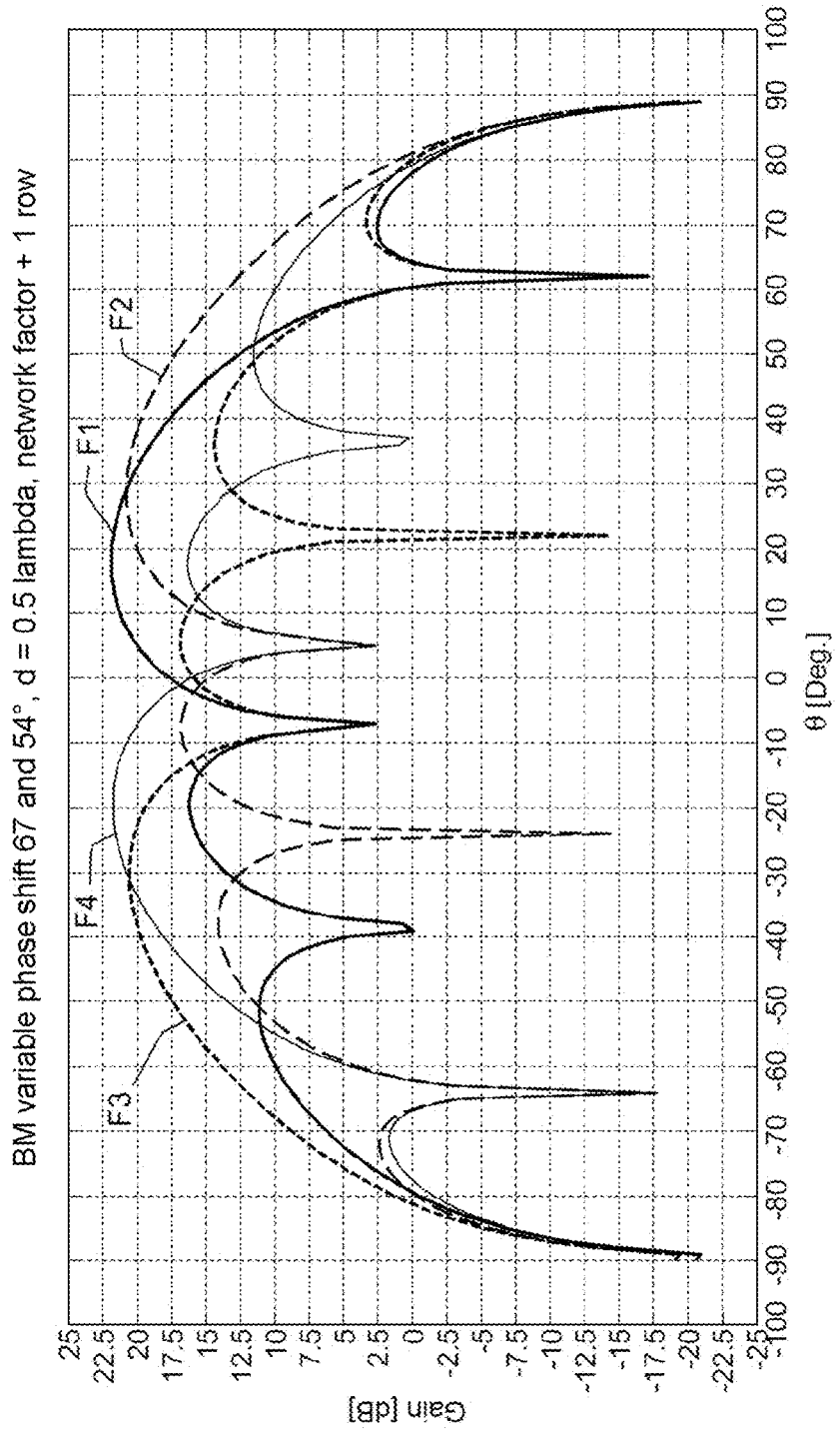
FIG. 7 shows the radiation graphs through adjustment of the pathways by phase shifting.

For reception, this would be at the input of the MBF. These phase shifters have another essential role: they compensate for the phase shifts brought about by the line length differences that appear in the distribution of the local oscillator and possibly in the transposition and amplification MMICs. FIG. 7 shows an example of offset of the directions for a phase shift set.

The modules 23, 24, 25 and 26 are produced in microstrip or "strip line" printed circuit technology working at microwave frequencies with centimeter wavelengths. At these frequencies, the required band is obtained. The system has no consumption at all.

The SHF card may also comprise a synthesizer, and this will be used as a local oscillator for the SHF-EHF transposition at transmission and EHF-SHF transposition at reception. A synthesizer is necessary for programming the RF frequencies, for the quality of the phase noise that is necessary for the TDD modems known to a person skilled in the art and in order to make certain of the precision and the drift in the long term. The reason is that, at these frequencies and in a very wide band, these qualities are indispensable for correct operation of the system. In other words, the conventional frequency sources of standard point-to-multipoint systems (WiMAX, WiFi or other LMDSs) are not suitable for EHF and a very wide band, on account of the phase noise or instability being proportional to the square of the frequency.

Figure 5:
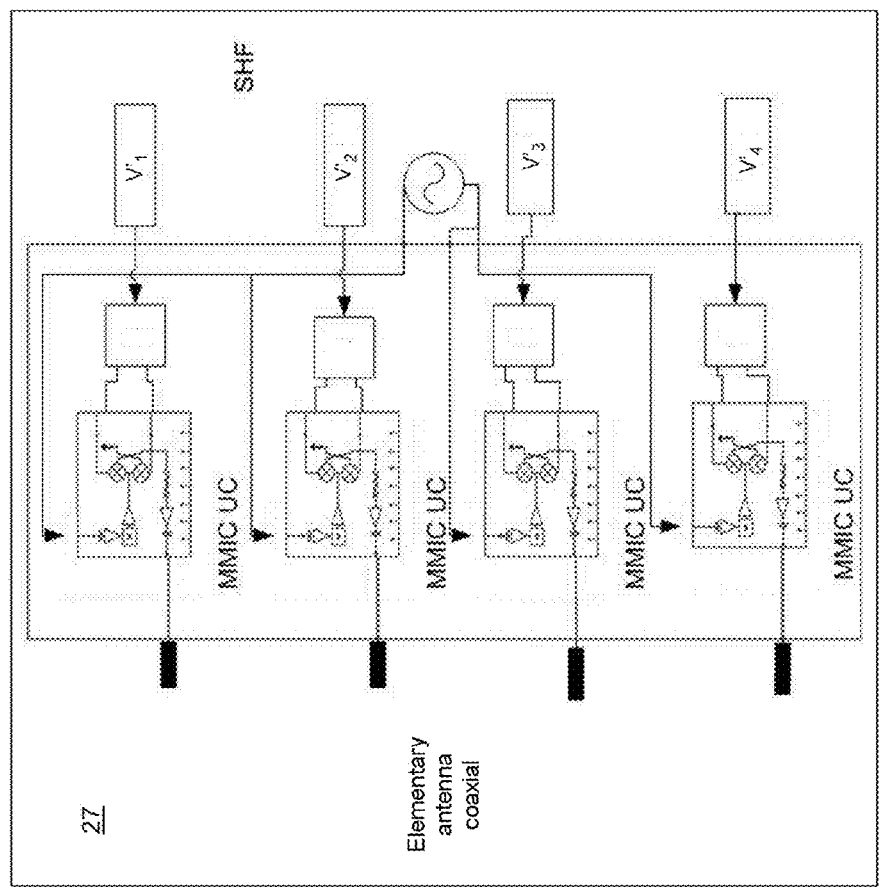
FIG. 5 shows an example of an EHF card for the transmission part of the system.

The EHF card makes it possible to transpose the device produced at SHF to the EHF range, and interfaces the pathway-formation transmission and reception subassemblies with the radiating elements of the antenna subsystem at EHF. It is made up of MMICs that carry out the following operations, shown in FIG. 5:

at transmission, the operations are as follows: controlled amplification, in order to process the losses from the SHF card of the passive circuits and notably from the amplitude-sensitive pathway formation; multiplication of the OL, transposition from SHF to EHF (generally with an OL rejection mixer), power preamplification, then, optionally, final power amplification, and finally microstrip transition towards the coaxial of the elementary antenna. There will be as many MMICs as there are beams and elementary antennas;

at reception, the operations are as follows: antenna coaxial to microstrip transition, very low noise amplification, OL multiplication, EHF-SHF transposition (generally with image rejection mixer), variable output amplification at SHF controlled in order to avoid any saturation of the modems and to balance the pathways so as not to degrade the diagrams created by the pathway formation. This amplitude balancing on reception takes place by virtue of the configuration by the management system 21 on the command of the attenuators of the MMICs.

These circuits are produced according to known GaAs, GaN/Si or SiGe technologies that have, at these millimeter frequencies, cited sub-functions that will be organized and fitted in these MMICs on the basis of the specifications of the system.

Figure 8:
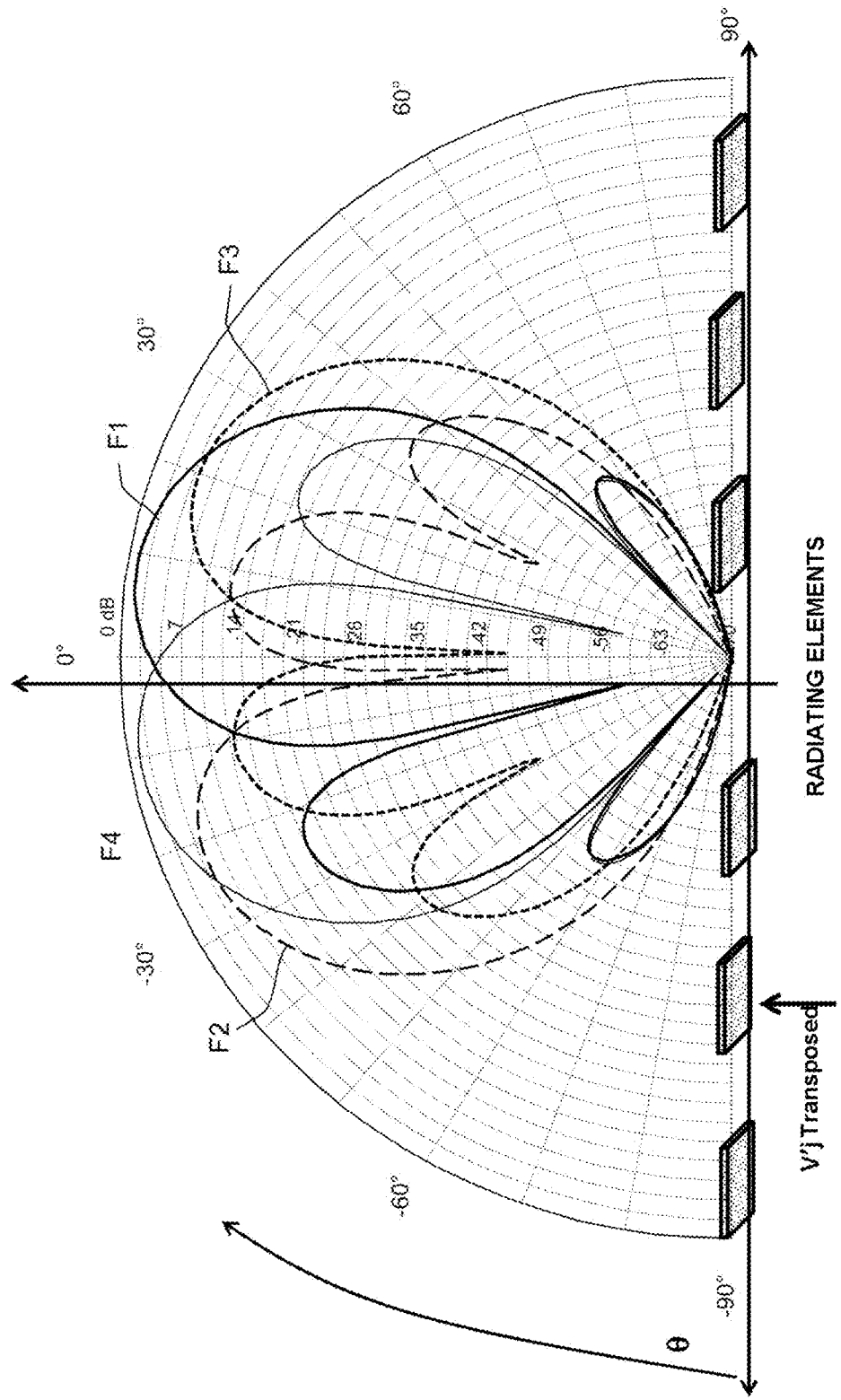
FIG. 8 shows the creation of the beams by association of the radiating elements.

In order to produce the radiation of the beams, for example at transmission, each of the pathways V'j, once transposed to EHF, will be injected into as many radiating elements of an antenna system, which will constitute the beams as shown in FIG. 8. Two antenna solutions are provided as an example in accordance with the coverage aims.

The antenna 90, an example of which is provided in FIG. 9A, has at least two "column" antennas 90, 90b, presented below, having a unity gain of 16 dbi, for example, for an antenna with 90° azimuth and 6° elevation. The association of these "column" antennas with the inputs V'j created by the formation of pathways will create a number of beams that is equal to the number of elementary antennas. Each beam will have an elevation width identical to that of the "column" antenna, an azimuth width equal to that of the elementary "column" antenna divided by the number of antennas, and finally will have a gain multiplied by this same number of antennas. The "column" antennas can be produced in two ways, for example, either by associating a vertical set of slots, the illumination of which is made up by a waveguide (slot antennas), or by virtue of a vertical set of patches provisioned by microstrip lines (patch column, FIG. 9); several implementations using this technology have been produced successfully in the EHF range. This antenna device is intended for broad coverage (90°), approximately, and beam lobes of 20 to 30° spaced by 10 to 30°. The gain of each beam is approximately 21 dBi for a 4-pathway system, for example. The more pathways and elementary antennas there are, the greater the number of beams and the greater the fineness and gain of said beams.

Figure 9B:
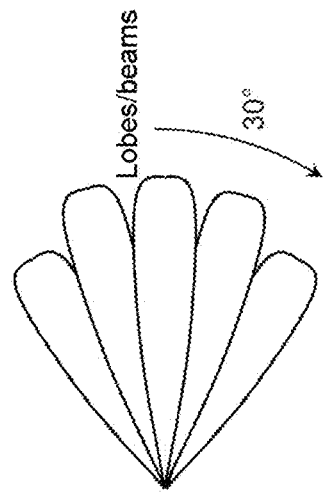
FIG. 9A and FIG. 9B show two examples of an antenna subsystem.
Figure 9B:
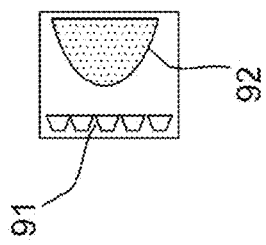
Figure 9A:
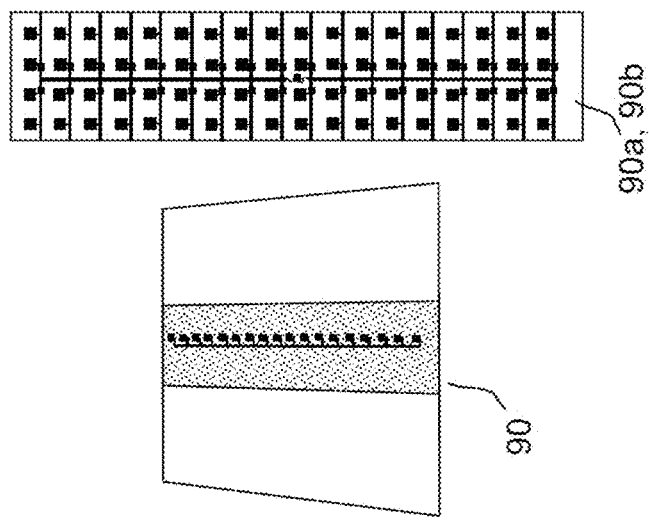

FIG. 9B shows an antenna example for operation in a narrower sector with tighter beams. In EHF waves, it is actually possible to produce directional antennas with lenses 92 as an optical system but with plastic materials. The lens is illuminated by a cornet or a patch source 91 at its focus.

With this technology, one way of producing the antenna system is to place in the horizontal focal plane of a lens, on either side of the optical axis, elementary sources connected to the transmission or reception MMICs as has been described above. In this case, beams are obtained, the shape of which is more or less that provided by the lens, having more or less the same gain and deflected in the horizontal plane on either side of the optical axis. The words "more or less" indicate that the closer a source is to the axis, the more the antenna lobe created has a shape close to that of the beam in the axis. Beyond two sources in relation to the axis, the beams are highly degraded. This antenna device is suitable for a tighter and more extensive coverage (in relation to the patch technology 3.4.3). It is intended for a coverage of 30 to 45° approximately, with lobes of approximately 10° spaced by the same angular value. The gain of a beam is this time approximately 26 dBi. In this case, it will be noted that the lens and its focal sources are the subject of fixed pathway formation and that the modules 25 and 26 are optional if the system requires only non-adjustable beams.

The manager 21 or NMS, an abbreviation for 'Network Management System', is a piece of software installed in a server of a head of a network (or even remotely) that provides for the configuration of the network and the surveillance or supervision thereof. Within the framework of the invention, the geographical positions of the terminals and the capacity demand thereof, referred to by the term Service Level Agreement (SLA), are entered into the base of the NMS. The NMS has the calculation of the link status (telecommunications equation, losses and gains per pathways of the device, etc.) of all the links that notably include the distance of the terminals and the gain of the beams in each direction (antenna diagram), as can be seen in FIGS. 7 and 8. For optimum operation of the network, the link statuses need to be balanced, which is the "near-far" processing in the device. The three key parameters are transmission power, reception level and local gain (in the direction of the terminal). An optimization algorithm (for example reading of tables or iterations) is implemented that allows the manager to configure the power of the modems on transmission, to remotely activate the power of the modems of the terminals, to adjust the gain of the receivers (MMIC) and to place the beams in the best way by virtue of control of the phase shifters. These operations are performed when the network is installed, when an additional terminal is introduced or during maintenance operation.

Equally, the NMS with the router supervises the load of each link (number of packets per second) in accordance with the time slots. An increase in activity in such and such a subsector (defined by a beam) will be noted when such a link arrives at saturation, and, through control of the switching matrix, the NMS will be able to assign an additional modem (in reserve in the modem stack, notably for resilience) or even reassign an under-used modem, the work of which will be adopted by the neighbouring modem (since the modems can serve a plurality of terminals, as shown in FIG. 1). The server NMS hosts a piece of software having the operating equations and the optimization algorithms, and the server therefore transmits the commands required through a virtual local area network or VLAN (which is well known to Ethernet network designers), which is secure, connecting all of the pieces of equipment implemented in the network or system, that is to say the transmission hub and the device and all the terminals.

Advantages

In relation to one point-to-multipoint system per sector, the device affords the following functions and advantages:
 set-up of the very high speed point-to-multipoint connections in a plurality of simultaneous beams,
 tiered assignment of the capacities in each beam formed,
 load balancing between the beams,
 gain over the statuses and optimized, adequate distribution of energy under the coverage,
 frequency isolation of the neighbouring sector,
 resilience of the links due to modem failure,
 processing of the gain according to the distance from a terminal to the base station,
 reuse of the spectrum, increase in the total capacity through reuse of the intermediate frequency channels,
 greater reliability through the use of passive or active circuits of GaAs type,
 energy savings because only the areas in which the clients are located are illuminated.

By way of example, if the system described in FIG. 1 were produced using a prior art method, 18 radio beams would be required in order to produce the backhaul, so 18 radios at the transmission node and 18 frequency pairs. This would lead to an installation problem at the transmission node, to frequency management, but especially to practically double the operating cost, site rental, rental of two frequencies per channel, twice more equipment to maintain and in point of fact, in these networks, in three years recurring costs equal purchase costs.

The invention claimed is:

1. A point to multipoint millimeter wave communication system, comprising a transmission subsystem, said transmission subsystem:
 an Extremely High Frequency (EHF) microwave device comprising:
  a manager processor configured to control and supervise frequencies and levels of a plurality of frequencies associated with a plurality of modems, and switches configured to assign respective beams to said plurality of modems;
  a stack of high capacity modems in the plurality of modems of at least 40 MHz each being configured by said manager processor, each modem having an input and an output of an analog stream in a Super High Frequency (SHF) range;
  an analog switching circuitry configured to assign said high capacity modems to a multiplexer using said manager processor;
  the multiplexer being an analog multiplexer adapted to multiplex said switched modems onto as many intermediate ports each corresponding to a beam, whereby a group of modems is assigned to a group of pathways (Vj),
  a passive SHF beam-former circuit for forming pathways to create a network of said beams distributed regularly about an axis of an antenna of said point to multipoint millimeter wave communication system;
  a phase shift module configured to provide a phase shift corresponding to an angular offset ($\Delta\phi$) on each pathway of the group of pathways (Vj) to place the beams with a desired precision with respect to one another, said phase shift being associated with phase shift coefficients; and
  an EHF set of Monolithic Microwave Integrated Circuits (MMICs) configured to perform a first transposition of SHF frequencies to EHF frequencies and to perform a power amplification, said EHF set of MMICs directly receiving inputs from intermediate antenna ports (Vi) of at least two elementary column antennas, said EHF set of MMICs connected to a common local oscillator, such that each output of said EHF set of MMICs is directly on each of the at least two elementary column antennas, wherein the point to multipoint millimeter wave communication system includes a simultaneous multi-link of a bandwidth of at least 500 MHz on directional beams for a given coverage, using the at least two elementary antennas.

2. The point to multipoint millimeter wave communication system according to claim 1, comprising, symmetrically, on a reception subsystem thereof:

additional at least two elementary column antennas, identical to the at least two elementary column antennas, directly connected to low noise receivers of the EHF set of MMICs controlled by the common local oscillator, said EHF set of MMICs configured to perform a low noise amplification and a second transposition from EHF frequencies to SHF frequencies, with inputs directly on each said at least two elementary column antenna connector and the common local oscillator and each output of said EHF set of MMICs is connected to the phase-shift module applying same phase-shift coefficients as for the transmission subsystem on each of the beams;

an SHF beam-steering circuit to deviate the beams from intermediate frequency ports (Vi) of the at least two elementary column antennas, deviation angles of said beams being controlled by the manager processor;

an SHF beam-former circuit connected to a path of said intermediate frequency ports (Vi);

an analog de-multiplexer configured to direct a combination stream corresponding to each of said beams to a switching circuit, the switching circuit configured to connect the de-multiplexed combination stream to the stack of high capacity modems configured by the manager processor.

3. The point to multipoint millimeter wave communication system according to claim 2, wherein said point to multipoint millimeter wave communication system is configured to operate on an optimised combination of SHF and EHF frequencies.

4. The point to multipoint millimeter wave communication system according to claim 2, wherein the SHF beam-forming circuits, the SHF beam-steering circuits, and the stack of high capacity modems working in the SHF range are passive circuits, and wherein said EHF set of MMICs are GaAs MMICs.

5. The point to multipoint millimeter wave communication system according to claim 4, wherein the common local oscillator is a programmable synthesiser having a threshold stability with very low phase noise, and is connected to the EHF set of MMICs in the transmission subsystem and the reception subsystem.

6. The point to multipoint millimeter wave communication system according to claim 2, wherein the common local oscillator is a programmable synthesiser having a threshold stability with very low phase noise, and is connected to the EHF set of MMICs in the transmission subsystem and the reception subsystem.

7. The point to multipoint millimeter wave communication system according to claim 1, wherein said point to multipoint millimeter wave communication system is configured to operate on an optimised combination of SHF and EHF frequencies.

8. The point to multipoint millimeter wave communication system according to claim 1, wherein the common local oscillator is a programmable synthesiser having a threshold stability with very low phase noise, and is connected to the EHF set of MMICs in the transmission subsystem and the reception subsystem.

9. The point to multipoint millimeter wave communication system according to claim 1, wherein the at least two elementary antennas are patch column antennas.

* * * * *